April 24, 1962 W. LAEUFER ET AL 3,031,250

CONTINUOUSLY OPERABLE RECORDING APPARATUS

Filed Nov. 12, 1959 2 Sheets-Sheet 1

April 24, 1962 W. LAEUFER ET AL 3,031,250

CONTINUOUSLY OPERABLE RECORDING APPARATUS

Filed Nov. 12, 1959 2 Sheets-Sheet 2

United States Patent Office 3,031,250

Patented Apr. 24, 1962

3,031,250

CONTINUOUSLY OPERABLE RECORDING APPARATUS

Walter Laeufer and Benno Streu, Freiburg im Breisgau, Germany, assignors to Fritz Hellige & Co. G.m.b.H., Freiburg im Breisgau, Germany, a company of Germany Filed Nov. 12, 1959, Ser. No. 852,350
Claims priority, application Germany Nov. 17, 1958
5 Claims. (Cl. 346—76)

The present invention relates to recording apparatus suitable for the continuous recording of physical, chemical or physiological measurements, such as, for example, electric cardiographs and recorders of technical data.

The record can be made according to many well known or new methods, for example, by photography, by recording in ink, by pressing an electrically heated recording arm on a record carrier provided with a heat-sensitive layer, by burning out a metal coating on a record carrier by means of an electric spark, by transferring a colour tracing from a pigment carrier such as carbon paper to a record carrier by means of a recording arm, by magnetic recording or finally also by exposure of a superficially photo-electrically conductive record carrier and subsequent dusting with a coloured powder.

In all these methods a record carrier is required extending in a longitudinal direction, which normally coincides with the running direction, and having a width corresponding to the recording method, so that this carrier may have the form of a tape, strip or even a thread or wire. It may consist of paper, plastic, metal or any other material which is not too thick and is also sufficiently flexible and supple. This record carrier normally runs from a supply roll and should move at a constant speed through the recording station, i.e. the place where the actual record tracing is produced. In order to ensure trouble-free recording and the correct time co-ordination of the recorded fluctuations in measurement at all times, longitudinal positive tensioning of the record carrier is required and this is normally achieved by tensioning the record carrier between the driving means, e.g., a pair of rollers driven by a motor, and braking means, such as a friction brake. The driving means grip the record carrier at a point which is just beyond the recording station where the actual record trace is produced, while the braking means are just before the recording station.

One object of the present invention is to obtain in a recording apparatus tensioning of the record carrier as it is guided through a recording station without encountering any substantial loss of energy in the form of heat of friction.

Another object of the present invention is to tension the record carrier by extracting from it in reusable form most of the energy imparted thereto in order to traverse it through the recording station.

A further object of the present invention is to resupply such extracted energy to the driving means for traversing the record carrier through the recording station.

Figures 1, 2, 3, 6, 7:
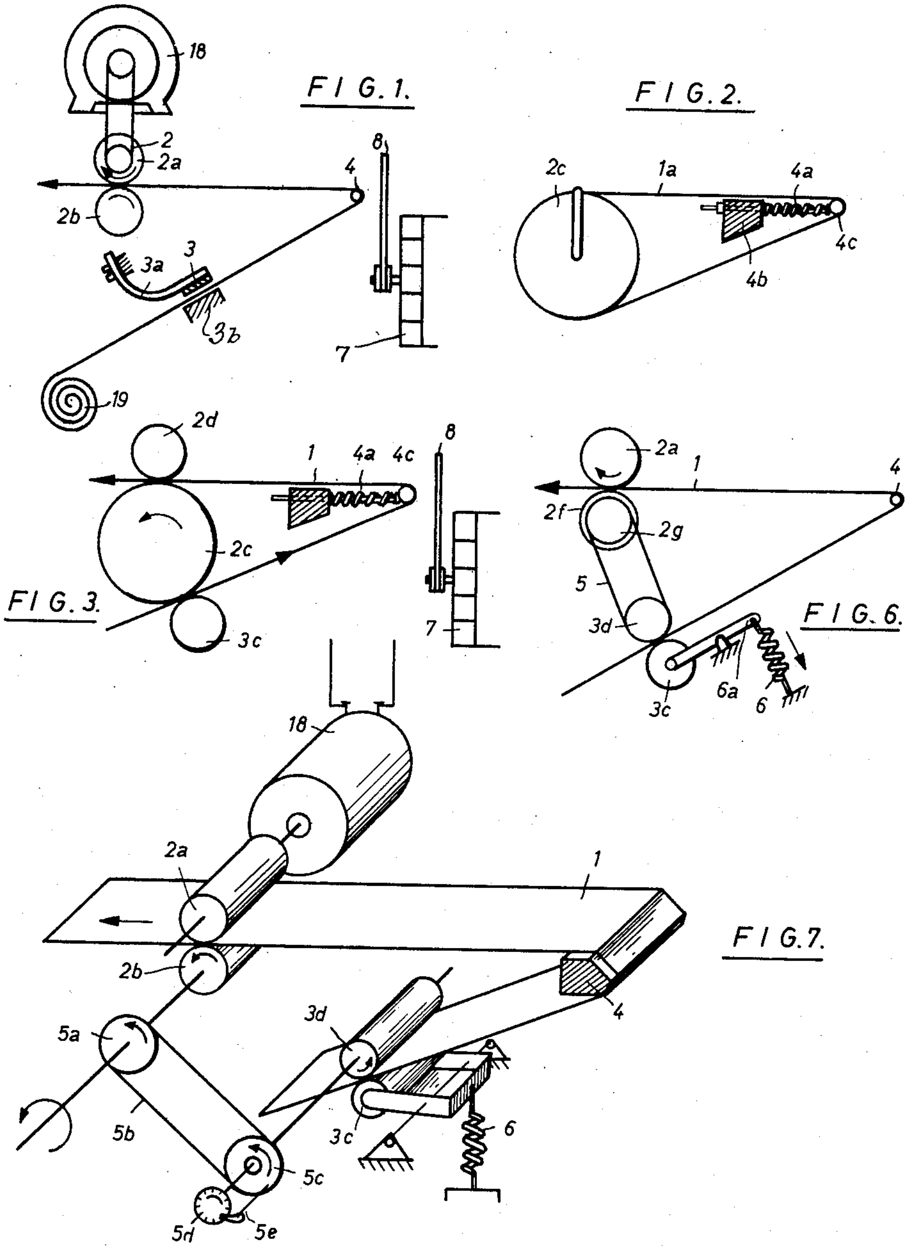
Figure 4:
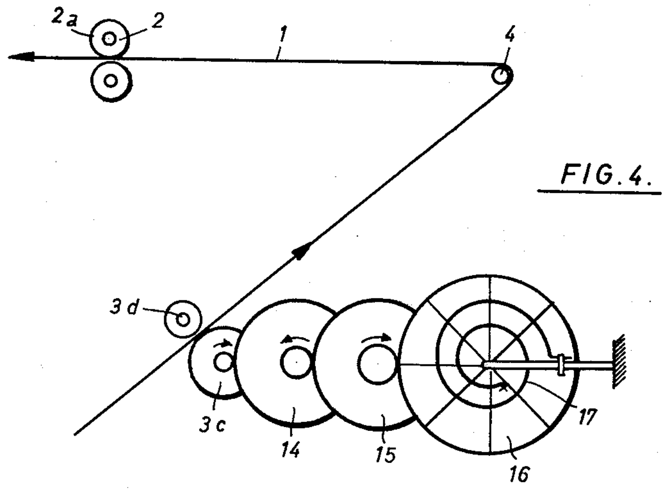
Figure 5:
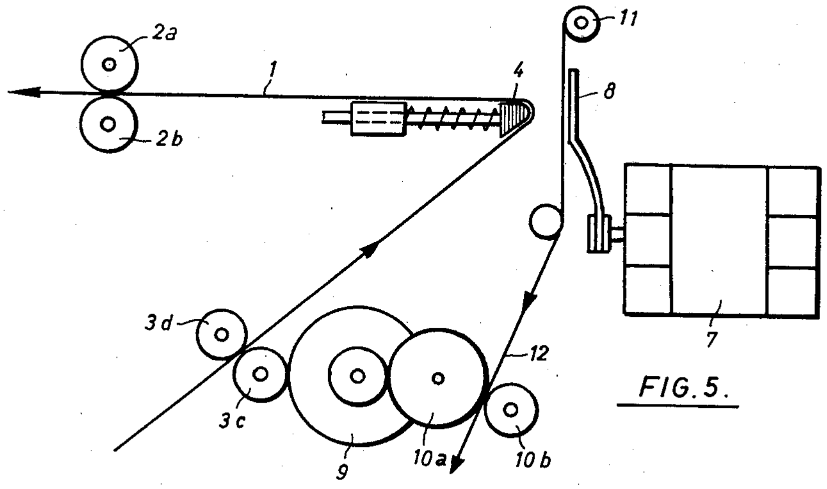

Still further objects of the present invention will be apparent to those skilled in the art from the following detailed description when read in conjunction with the accompanying diagrammatic drawings in which:

FIG. 1 is a diagrammatic detail cross section of a known kind of recording apparatus, FIG. 2 is a similar cross section illustrating one embodiment of the invention for an endless record carrier, FIG. 3 is a similar cross section of a second embodiment of the invention for a record carrier not connected at its ends, FIG. 4 illustrates a further embodiment in which braking is effected by means of a clockwork mechanism, FIG. 5 illustrates another embodiment in which braking of the record carrier is effected by coupling braking rollers to a pigment carrier drive, FIG. 6 illustrates an embodiment of the invention with a direct coupling between the driving means and the braking means, FIG. 7 illustrates still another embodiment relating to the coupling between the drive and the braking means, namely, by means of a free-wheel arrangement in such a manner that the braking rollers per se are driven only by the record carrier.

This known method for keeping the running speed of the record carrier constant and for the rigid tensioning thereof is shown diagrammatically in FIG. 1 of the accompanying drawings. It does not operate by adapting the supply of energy to the actual energy requirement necessary for feeding and tensioning the record carrier, but by retarding the record carrier with sliding friction and thereby absorbing excessive driving energy by conversion to heat of friction.

Referring now to the prior art arrangement shown in FIG. 1, a record carrier 1 which is taken from any kind of storage supply, for example by unwinding from a roll, passes through a braking or clamping mechanism 3 which is formed by a brake shoe **3*a* and an abutment 3*b* then, at a recording station, over a guide base 4, where a recording arm 8, moved by the measuring instrument 7, produces the record tracing, for example by melting an opaque layer of wax, on the record carrier 1. The recording arm 8 is attached to the armature of a measuring instrument 7 which is adapted to move the recording arm 8 responsively to signals, such as electrical signals, which are derived from the information to be recorded. The record carrier then passes, after being guided round the recording base 4, to the driving mechanism 2 and is there pinched between a pair of rollers 2*a*, 2*b* which are coupled to a driving motor 18. In co-operation with the driving mechanism 2, the braking mechanism 3 serves to tightly stretch the record carrier 1, which is generally in strip or tape form, for guidance round the base 4. The recording base is often, as shown, formed as a slim easily rotatable roller or, if the record carrier is very narrow, suitably constructed as an easily rotatable disc of small diameter in order to keep the friction reduced. The recording base 4 may also be in the form of a recording edge extending transversely to the record carrier. The tension applied by the drive 2 and transmitted to the record carrier 1 serves to overcome the friction in the storage roll 19, at the brake 3, at the recording base 4 and, finally, also to overcome the inherent stiffness of the tape during tensioning on the one hand, and during the bending round the recording base on the other hand. Since, in general, record carriers are only slightly elastic, a large frictional force must be exerted by the brake 3** to keep the tape taut so that, in the prior art construction, the major part of the driving output is lost at this point due to heat of friction. In contrast to this, the portions of the driving output for overcoming the inherent stiffness of the record carrier and the frictional forces at the recording base and at the place of storage are usually comparatively small.

According to one feature of the present invention recording apparatus, suitable for the continuous recording of information such as physical, chemical or physiological measurements, comprises means for continuously traversing a record carrier through a recording station and for tensioning said record carrier at said recording station without encountering any substantial energy loss through friction, and means at said recording station for recording information on said record carrier.

According to another feature of the present invention recording apparatus, suitable for the continuous recording of information such as physical, chemical or physiological measurements, comprises means for continuously supplying energy to a record carrier to traverse it through a recording station and for continuously extracting energy from said record carrier in a form other than heat of friction to tension said record carrier at said recording station, said extracted energy comprising a major portion of said energy supplied to said record carrier, and means at said recording station for recording information on said record carrier.

Thus the energy which it is necessary to extract from said record carrier to tension it may be converted by braking rollers or discs into useful work by coupling to an energy storer or by coupling to the drive of the record carrier or, in the case of pigment recording, by coupling to the drive for the pigment carrier.

Referring to FIG. 2 of the drawings, in order to apply the present invention to an endless record carrier 1*a*, i.e. one which has its ends joined together, a single roller 2*c* is provided both for driving and braking the record carrier 1*a* which preferably passes around the roller in interlocking engagement therewith. The roller 2*c* is driven by a motor (not shown), somewhat corresponding to that illustrated in FIG. 1. The tension in the record carrier is adjusted by means of a spring 4*a* acting between a recording base in the form of a roller 4*c* and an adjustably fixed abutment 4*b*. Substantially it is only necessary for the drive to apply to the roller 2*c* the work necessary to overcome inertia and the inherently small external and internal friction effects. No actual braking work need be performed.

The embodiment of FIG. 2 is a special case of the embodiment shown in FIG. 3 in which the record carrier is not connected at its ends. In the arrangement of FIG. 3 a roller 2*c* co-operates as a driving roller with a driving roller 2*d* and co-operates as a braking roller with a braking roller 3*c* to positively maintain the record carrier 1 in tension after it has once been tensioned. The record carrier 1 should have a positive interlocking engagement with the rollers 2*a*, 2*c* and 3*c* or at least with the roller 2*c*; for example, the record carrier may be in the form of a strip which is perforated at regular intervals therealong so that teeth on the rollers can positively engage the record carrier. In this manner it is assured that the record carrier 1 emerges from between driving roller 2*a* and the roller 2*c* at the same speed as it enters between the braking roller 3*c* and the roller 2*c* so that the record carrier tension, which is initially adjusted at the recording roller 4*c* by means of the spring 4*a* is maintained.

If there is no positive locking between the record carrier and the rollers it may be necessary to take additional steps to ensure that the record carrier tension is fully maintained, for example as illustrated in FIGS. 6 and 7 which will be referred to later.

Another embodiment of the invention is shown in FIG. 4 and is based on the feature that the energy it is necessary to extract from the record carrier 1 to tightly tension the record carrier is not lost in the form of heat of friction but is stored in a re-usable form. As shown in FIG. 4, braking rollers 3*d*, 3*c* can be coupled by means of step up gears 14, 15 and 16 to a spring mechanism 17 which can be tightened to that the energy, provided by the drive 2 to the record carrier 1 and extracted to effect the braking action, is stored in the spring 17.

The tension depends not only on the strength of the spring 17, but also on the transmission ratio of the intermediate gears 14, 15 and 16. Thus there are several ways of adjusting the tension to the desired tension in accordance with the stiffness of the record carrier. A spring mechanism similar to the spring mechanism 17 may be used for operating the driving mechanism 2. The inherent frictional forces which are unavoidable do result in some energy loss and if this is made up again from outside by fully winding up the spring mechanism 17 it can then be used as a driving mechanism.

In a development of the embodiment of the invention shown in FIG. 4 a single clockwork mechanism simultaneously performs the function of the driving mechanism and the energy storing mechanism.

In the embodiment shown in FIG. 5 in which pigment recording is employed, braking rollers 3*d*, 3*c* for tensioning the record carrier are coupled by way of gears 9 to an auxiliary drive 10*a*, 10*b* for driving a pigment carrier 12. Thus, the force required for braking or tensioning the record carrier 1 is supplied by the pigment carrier 12 which also requires tensioning as it is unwound from a supply roll 11, for example, by tensioning it in the same manner as the record carrier is tensioned according to the invention. In the said pigment recording, a pigment trace is produced on the record carrier 1 from a pigment carrier 12, for example a strip of carbon paper, by the pressure exerted by a recording arm 8 towards the recording base 4. Although the pigment carrier 12 is generally moved at less speed through the recording station, similar problems as in the case of the unwinding of the record carrier occur, so that the present invention can also be used for tensioning the pigment carrier.

In the arrangement shown in FIGS. 6 and 7 driving rollers 2*a* and 2*f* or 2*b* are coupled to braking rollers 3*d* and 3*c* so that energy extracted from the record carrier to tension it is resupplied to the driving roller. The braking rollers are coupled with or without slip to the driving rollers in such a manner that the peripheral speed of the braking rollers is equal to or, as shown in FIG. 6 where the record carrier and the rollers are not positively interlocked, preferably less than the peripheral speed of the driving rollers. Preferably, as shown in FIG. 6, a certain amount of slipping should be permitted. This is achieved by the resilient mounting of the braking roller 3*c* on a lever 6*a* loaded by a spring 6 which is preferably of adjustable tension. This permitted slipping arrangement can compensate for any irregularities in the movement and stiffness of the record carrier. The slight amount of slipping which may occur leads to negligible friction losses in practice.

In the embodiment shown in FIG. 7, the braking rollers 3*d*, 3*c*, are coupled by way of a free-wheel gear arrangement 5*a*, 5*b*, 5*c*, to the pair of driving rollers 2*a*, 2*b* in such manner that the braking rollers are driven only by the moving record carrier. Consequently, they remain stationary when the record carrier feed is first switched on, until the record carrier is sufficiently tensioned. For example, a pawl and ratchet mechanism 5*e*, 5*d* in the free wheel gear arrangement ensures, if the diameters of the rollers are suitably chosen, that the peripheral speed of the braking rollers in every phase of operation remains less than and in any case, at the most equal to that of the driving rollers, and the record carrier, according to the circumference of the two pairs of rollers, is stretched and tensioned. As in the preceding embodiment, one of the braking rollers 3*d*, 3*c*, is in turn resiliently journalled with adjustable bearing pressure as far as possible.

The energy which must be employed in retarding the record carrier to tension it may also be converted into electrical power. For example, the braking mechanism could be coupled to a small generator which, in certain circumstances, serves as a current source for other parts of the recording apparatus such as for pilot lamps and the like.

In pursuing the concept of the invention there is no substantial conversion of the energy extracted for the tensioning of the record carrier which is usually not very elastic, into heat of friction. If energy must be used in the retarding operation this can be stored in a re-usable form or returned to the driving mechanism for the record carrier or for the pigment carrier. Due to the small output requirements of the driving mechanism resulting therefrom, lighter motors or spring mechanisms can be used, a feature which, in addition to a saving in weight, may also result in saving of space and these advantages favour the obtaining of recording apparatus of light and small construction.

Although the expression "roller" has been used throughout the description of the above embodiments of the invention it is to be understood that where the width of the record carrier is small compared with the diameter of the "rollers" the "rollers" may be more in the nature of discs or wheels.

We claim:

1. Apparatus for recording information on a record carrier, said apparatus comprising: driving rollers adapted for engaging said record carrier to advance the same, braking rollers operatively positioned relative to said record carrier to engage the same and exert braking effort thereon to provide tension in said record carrier, means between said driving rollers and braking rollers and adapted to engage said record carrier and record said information thereon, means coupling said driving rollers and braking rollers in driving relation such that the braking rollers drive the driving rollers whereby braking energy is conducted to the driving rollers for a driving function.

2. Apparatus as claimed in claim 1, wherein the means coupling said driving rollers and braking rollers comprises a first roller coupled to one of the driving rollers and a second roller coupled to one of the braking rollers, the first and second rollers being coupled in driving relation, the apparatus further comprising means for urging another of the braking rollers towards said one braking roller to perform a braking function on the record carrier which is adapted to pass between said braking rollers, and means for driving the other of the driving rollers.

3. Recording apparatus for the continuous recording of information comprising braking rollers, driving rollers, a record carrier adapted for being driven by said driving rollers through said braking rollers, the braking rollers being operatively positioned relative to said record carrier to exert a braking effort thereon, a recording station between said braking rollers and driving rollers and engaging said record carrier, said recording station including means for recording information on said record carrier, said braking rollers, driving rollers and recording station being geometrically positioned to define a path for said record carrier and to provide tension in the record carrier at said recording station, and means connecting said driving rollers and braking rollers in driving relation and enabling a higher peripheral speed of the driving rollers relative to that of the braking rollers such that said braking rollers in part drive said driving rollers.

4. Recording apparatus as claimed in claim 3, wherein the means connecting said driving rollers and braking rollers adjusts the peripheral speed of the braking rollers to a value between 99 and $99^{99}/_{100}$ percent of the peripheral speed of the driving rollers.

5. Recording apparatus as claimed in claim 3 comprising a ratchet mechanism adapted for permitting the free rotation of the driving rollers with the braking rollers at rest to initially tension the record carrier.

References Cited in the file of this patent

UNITED STATES PATENTS

| | | |
|---|---|---|
| 1,817,432 | Angus | Aug. 4, 1931 |
| 2,034,543 | Twiss, et al. | Mar. 17, 1936 |
| 2,044,586 | Marcellus | June 16, 1936 |
| 2,280,973 | Phillippi | Apr. 28, 1942 |
| 2,341,652 | Rey | Feb. 15, 1944 |
| 2,454,247 | Young | Nov. 16, 1948 |
| 2,524,564 | Gorham | Oct. 3, 1950 |

FOREIGN PATENTS

| | | |
|---|---|---|
| 312,997 | Switzerland | Mar. 15, 1956 |
| 1,141,332 | France | Mar. 11, 1957 |